United States Patent [19]

Kimura

[11] 4,442,462

[45] Apr. 10, 1984

[54] VIDEO RECORDER/CAMERA HAVING A SHARED DRIVE

[75] Inventor: Takashi Kimura, Yokohama, Japan

[73] Assignee: Canon Kabushiki Kaisha, Tokyo, Japan

[21] Appl. No.: 298,332

[22] Filed: Aug. 31, 1981

[30] Foreign Application Priority Data

Sep. 4, 1980 [JP] Japan ............................. 55-122857

[51] Int. Cl.³ .......................................... H04N 5/782
[52] U.S. Cl. ................................. 360/33.1; 358/335; 358/906
[58] Field of Search .............. 360/33.1, 85; 358/335, 358/906

[56] References Cited

U.S. PATENT DOCUMENTS 4,008,489 2/1977 Gilsdorf et al. ..................... 360/85

FOREIGN PATENT DOCUMENTS 3101076 1/1981 Fed. Rep. of Germany ...... 358/906

Primary Examiner—Raymond F. Cardillo, Jr.
Attorney, Agent, or Firm—Toren, McGeady and Stanger

[57] ABSTRACT

In a video recorder, a loading mechanism for loading a recording medium in relation to a recording head, and a control mechanism for adjustment of an optical system of an associated video camera, are arranged to be selectively operated in response to the driving force of a common driving motor.

7 Claims, 5 Drawing Figures

VIDEO RECORDER/CAMERA HAVING A SHARED DRIVE

BACKGROUND OF THE INVENTION

1. Field of the Invention

This invention relates to a video recorder in which a portion functioning as video camera, and another portion functioning as recording apparatus, are arranged into a single unified assembly.

2. Description of the Prior Art

Reduction in size of apparatus such as a magnetic recording/reproduce apparatus (hereinafter will be called VTR) has recently been furthered. The portable VTR thus obtained has begun to be widely used for outdoor recording in combination with a video camera. However, at present, a TV camera and a VTR are still arranged as separate units thus necessitating connection between them by means of a cable when operating them. Therefore, they are still, by far, inferior to an 8 mm motion picture camera in portability and mobility. In the meantime, however, the recent trend of technological development indicates that a VTR incorporating a video camera therein, sooner or later will be made practical and become popular as a result of further reduction in size and weight of the video camera by virtue of the use of solid state image pick up elements, and also in size and weight of the VTR by virtue of the advancement of circuitry techniques utilizing integrated circuits. However, even if VTRs of the type incorporating cameras come to be realized, the unit thus obtained would be still considerably larger both in volume and weight then an 8 mm motion picture camera, thus leaving the problem of portability and mobility still unsolved. This calls for much effort in reduction in size and weight in designing the construction of a camera-incorporating type VTR.

SUMMARY OF THE INVENTION

It is an object of the invention to provide a video recorder which permits effective use of a driving force of the drive source provided therein.

It is another object of the invention to provide a compact, light weight video recorder.

It is a further object of the invention to provide a video recorder of simple construction.

A video recorder which is arranged to function as a video camera according to the invention has an adjusting mechanism for adjusting the optical system of the camera, and a recording medium loading mechanism arranged to be selectively operated with a single drive source through transmission means, so that reduction in size and weight of the video recorder and simplification of the construction thereof can be attained by reduction in the conventionally required number of drive sources.

In one embodiment of the invention, the above stated transmission means is arranged to shift the transmission of the driving force of the drive source to the optical system adjusting mechanism when the recording medium is in a loading completed position. This arrangement permits effective use of the drive source thus obviating the possibility of having its driving operation on the loading mechanism overlap its driving operation on the optical system adjusting mechanism.

These and further objects, features and advantages of the invention will become apparent from the following detailed description of a preferred embodiment thereof taken in connection with the accompanying drawings.

BRIEF DESCRIPTION OF THE DRAWINGS

The accompanying drawings illustrate a camera-incorporating type VTR as one example of embodiment of the invention.

DETAILED DESCRIPTION OF PREFERRED EMBODIMENT

Figure 1:
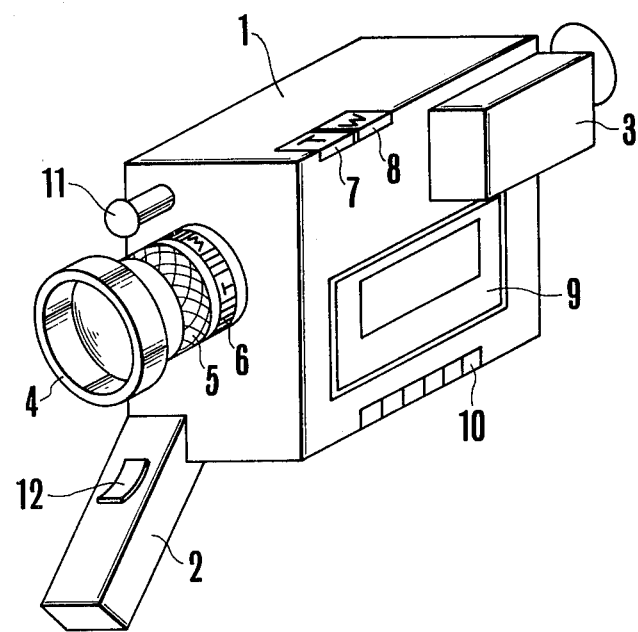
FIG. 1 is an oblique view showing the appearance of the VTR.

The appearance of a preferred embodiment of the invention is as shown in FIG. 1. A body frame 1 has a grip 2 foldably attached to a lower part thereof. When not in use, the grip 2 can be stowed in a recess which is provided in the frame 1 but is not shown. The grip 2 is provided with release button 12. An electronic view finder 3 is arranged to be attachable to and detachable from the body frame 1. When the view finder 3 is detached, an optical view finder which is not shown but is disposed within the body can be used. A lens portion 4 serves as an optical system and is provided with a range adjustment ring 5 and a zooming operation ring 6. A focusing optical system and a zoom optical system which are not shown are arranged to be adjustable by these rings 5 and 6 respectively. There are provided zoom buttons 7 and 8 for telephoto imaging (T) and for wide-angle imaging (W) respectively. As will be described later, an operation of each of these buttons 7 and 8 causes a zooming operation to be automatically carried out by means of a motor. A recording medium is placed within a cassette accommodating part 9. In this embodiment, use of a magnetic recording tape as a recording medium is contemplated. There are provided a group of operation buttons 10 and a microphone 11. A depressing operation on a recording button included in the group of buttons 10 renders the VTR operative for recording. Recording is performed when the release button 12 is depressed under this condition.

Figure 2:
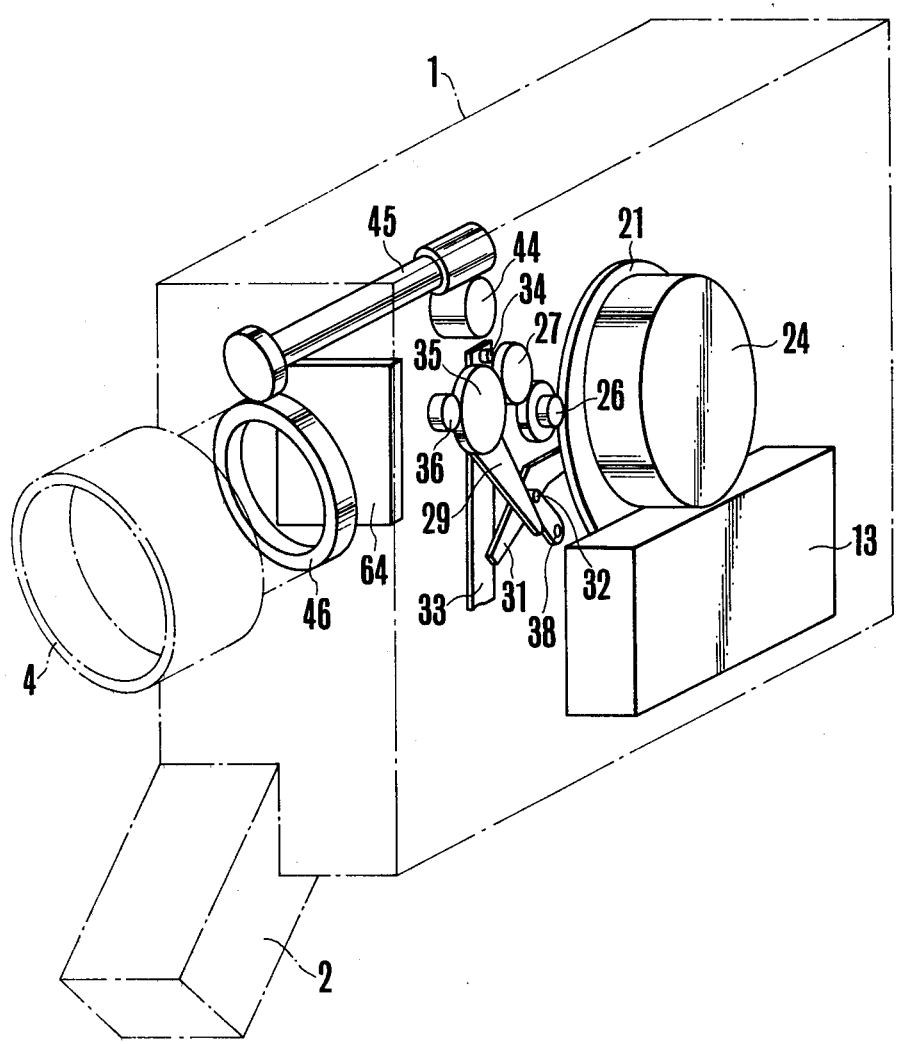
FIG. 2 is an oblique view showing the essential parts of the inner structural arrangement.
Figure 3:
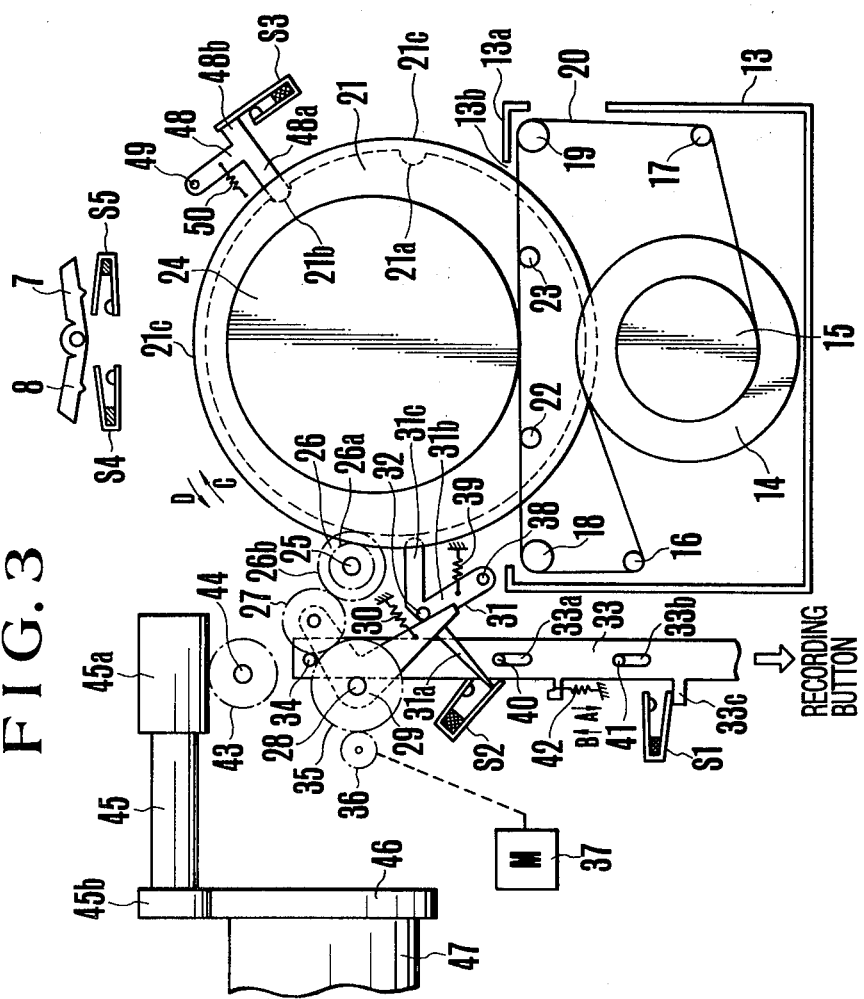
FIG. 3 is an illustration of the structural arrangement as in an inoperative condition.
Figure 4:
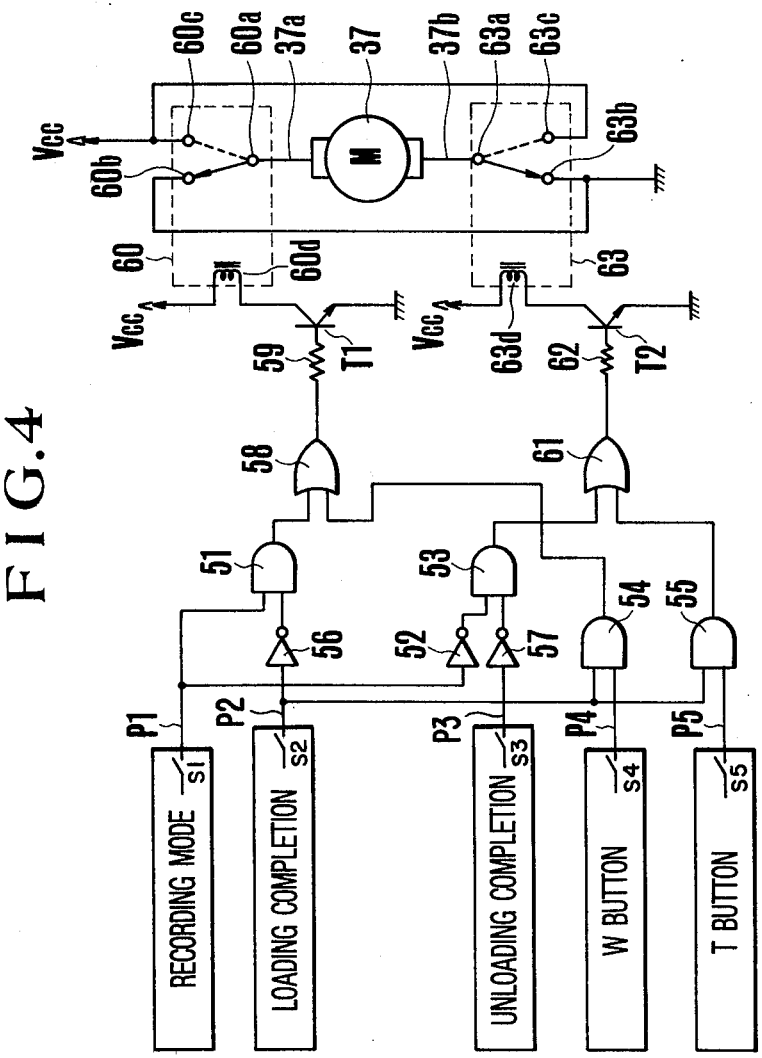
FIG. 4 is a circuit diagram showing the driving circuit of a motor of the VTR.

FIGS. 2 and 4 show the arrangement of the essential parts of the embodiment. Referring to the drawings, a tape cassette 13 is placed in the above stated cassette accommodating part 9. As shown in detail in FIG. 3, a feed reel 14 and a take-up reel 15 are coaxially disposed, one on top of the other. Stretched between these reels 14 and 15 through tape guide pins 16, 17, 18 and 19 is a tape 20. An opening 13b is formed in the front wall 13a of the box body of the cassette 13. The guide pins 18 and 19 cause the tape 20 to be stretched in such a way as to have the recording surface facing the opening 13b. Further, in the front part of the lower side plate (not shown) of the box body of the cassette 13, there is provided a given cutout part which is formed to continue from the above stated opening 13b so that when the cassette 13 is placed in a predetermined position in the cassette accommodating part 9, tape pull-out guides arranged on a loading ring 21 come to be positioned on the inner side of the tape 20 which is stretched to face the opening 13b.

The loading ring 21 is arranged to pull out the tape 20 from a predetermined position within the cassette 13 (a first position) to have the tape displaced by being wound around a guide drum 24 to a predetermined extent into a position (a second position) in which magnetic recording can be performed thereon by a rotary magnetic head when the ring 21 is driven to rotate as will be described later. Meanwhile, the guide drum 24 is secured at an eccentric position over the loading ring 21, i.e. not coaxially with the ring 21.

Hereinafter the operation of pulling the tape out from the first position within the cassette 13, and displacing it to the second position by winding it on the guide drum 24, will be called loading; and another operation of unwinding the tape 20 from the guide drum 24 to bring it to its condition prior to loading, will be called unloading. The outer circumference of the loading ring 21 has recessed parts 21a and 21b formed therein to correspond to a loading completion position, and to an unloading completion position, respectively. In addition to these recessed parts, a driving gear part 21c is formed along the upper edge of the outer circumference of the loading ring 21. This gear part 21c is arranged to have the small diameter part 26a of another gear 26 engage therewith, while the gear 26 is pivotally supported by a pin 25 which is supported on a chassis (not shown). Under the inoperative condition shown in FIG. 3, the large diameter part 26b is in a state of being engaged with a change-over gear 27 which serves as transmission means. The change-over gear 27 is rotatably attached to one end part of an L-shaped power change-over lever 29 which serves as change-over means and is pivotally supported by a pin 28 which is supported on the chassis.

The change-over lever 29 is urged to rotate counterclockwise by a spring 30. The counterclockwise rotation of the change-over lever 29 is prevented by a lock pin which is supported on a loading end detecting lever 31, and also by another lock pin 34 which is supported on a slide plate 33. The pin 28 which has the above change-over lever 29 fitted thereon also has a gear 35 rotatably fitted thereon. Further, the gear 35 is arranged to be always in engagement with the gears 27 and 36. The gear 36 is secured to the rotating shaft of a d.c. motor 37 and is arranged to rotate together with the motor 37. By this arrangement, the rotation of the motor 37 is always transmitted to the change-over gear 27 which is attached to one end part of the change-over lever 29.

The loading end detecting lever 31 comprises three arms 31a, 31b and 31c, which are linked together in the middle part of the lever 31. The fore end part of the middle arm 31b is rotatably fitted on a pin 38 which is supported on the chassis. Meanwhile the detecting lever 31 is urged to rotate clockwise by a spring 39 and is thus biased to have the end of the right hand side arm 31c in a state always abutting on the outer circumference of the loading ring 21. Further, the end of another arm 31a of the detecting lever 31 is arranged to abut on a micro switch S2 which is provided for detecting completion of loading. Under the inoperative condition as illustrated by FIG. 3, the micro switch S2 is thus kept in an off state by the end of the arm 31a of the detecting lever 31.

The above stated slide plate 33 is arranged to be slidable in the directions of arrows A and B shown in the drawing within a predetermined range by position defining pins 40 and 41 which are fitted in slots 33a and 33b provided in the slide plate 33. Meanwhile, the slide plate 33 is always urged to move in the direction of arrow A by a spring 42. The slide plate 33 is interlocked with a recording button (not shown) which is included in the group of the above mentioned operation buttons. A depressing operation on the recording button causes the slide plate 33 to slide in the direction of arrow B against the urging force of the spring 42. Further, this slide plate 33 is provided with an actuating piece 33c which is arranged to bring a recording mode detecting micro switch S1 into an on state when the slide plate 33 is caused to slide in the direction of arrow B.

A worm wheel 43 is disposed in a predetermined position close to the upper end of the slide plate 33. The worm wheel 43 is pivotally supported by a pin 44 and engages another worm gear 45a formed at one end of a force transmission shaft 45. The other end of the force transmission shaft 45 has a gear 45b formed there. The gear 45b engages a zooming gear 46. A cam ring 47 which is for zooming operations is arranged to rotate together with the zooming gear 46. When the transmission shaft 45 rotates, the cam ring 47 rotates to carry out a zooming operation. The gears 43, 45a, 45b and 46, the cam ring 47, etc. constitute a zoom optical system control means. Further, the control means may be arranged to drive a focusing optical system in addition to the zoom optical system.

An unloading completion detecting lever 48 which is formed into a T shape is disposed close to the outer circumference of the above stated loading ring 21. This lever 48 is pivotally supported by a pin 49 and is urged by a spring 50 to rotate clockwise. The urging force of the spring 50 causes one end 48a of the lever 48 to be always abutting on the outer circumference of the loading ring 21. Under the inoperative condition as shown in FIG. 3, the end 48a of the lever 48 is thus in a state of having fallen in the recess 21b formed in the outer circumference of the loading ring 21 to correspond to completion of unloading. The other end 48b of the lever 48 abuts on a micro switch S3 for detecting completion of unloading. The micro switch S3 is thus kept in an on state when the above stated end 48a of the lever 48 is in the state of having fallen in the recess 21b.

Micro switches S4 and S5 correspond respectively to the above stated zoom buttons 8 and 7 and are arranged to be turned on when the zoom buttons 8 and 7 are depressed. The zoom buttons 7 and 8 are formed into a seesaw like or rocker switch. One of the two zoom buttons is always released from a depressed state when the other is depressed. They are thus arranged never to be simultaneously depressed.

The driving circuit of the d.c. motor 37 mentioned in the foregoing is arranged as shown in FIG. 4. The circuit comprises the micro switch S1 for detecting the recording mode; the micro switch S2 for detecting completion of loading; the micro switch S3 for detecting completion of unloading; the micro switch S4 which is interlocked with the zoom button 8 for wide-angle photo imaging; and the micro switch S5 which is interlocked with the zoom button 7 for telephoto imaging. When each of the micro switches S1–S5 is on, the level of the output thereof P1, P2, P3, P4 or P5 becomes high. The level of the output is arranged to become low when each of the micro switches turns off.

The output P1 is arranged to be supplied to an AND circuit 51 and also to an AND circuit 53 after it is inverted through an inverter 52. The output P2 of the switch S2 is supplied to AND circuits 54 and 55 and also to the above stated AND circuit 51 after it is inverted through inverter 56. The output P3 of the switch S3 is supplied to the above stated AND circuit 53 through an inverter 57. The outputs P4 and P5 of the switches S4 and S5 are supplied respectively to the above stated AND circuits 54 and 55.

The outputs of the AND circuits 51 and 54 are supplied to an OR circuit 58. The output of the OR circuit 58 is supplied through a resistor 59 to the base of a switching transistor T1 which is arranged for driving a relay 60.

The outputs of the AND circuits 53 and 55 are supplied to an OR circuit 61. The output of the OR circuit 61 is in turn supplied through a resistor 62 to the base of a switching transistor T2 which is arranged for driving a relay 63.

The collectors of the above stated transistors T1 and T2 are connected to a d.c. power source Vcc respectively through the exciting coils 60d and 63d of the relays 60 and 63. The emitters of these transistors T1 and T2 are grounded.

The relays 60 and 63 are arranged to control the driving operation and the rotating direction of the d.c. motor 37. The lead terminals 37a and 37b of the motor 37 are connected respectively to the fixed terminals 60a and 63a of the relays 60 and 63. The fixed terminals 60a and 63a of the relays 60 and 63 are normally connected to change-over terminals 60b and 63b respectively. When an exciting current is supplied to the exciting coils 60d and 63d, the connection of the fixed terminals 60a and 63a is shifted from the change-over terminals 60b and 63b to change-over terminals 60c and 63c. The change-over terminals 60b and 63b of the relays 60 and 63 are grounded while the change-over terminals 60c and 63c are respectively connected to the d.c. power source Vcc.

Inside the body frame 1, there are provided image pick up means such as a solid state pick up element in combination with the lens part 4 which serves as an optical system, related circuits and an electronic circuit for magnetic recording and reproduction, etc. However, since details of these parts are well known, they are omitted from the description herein.

Figure 5:
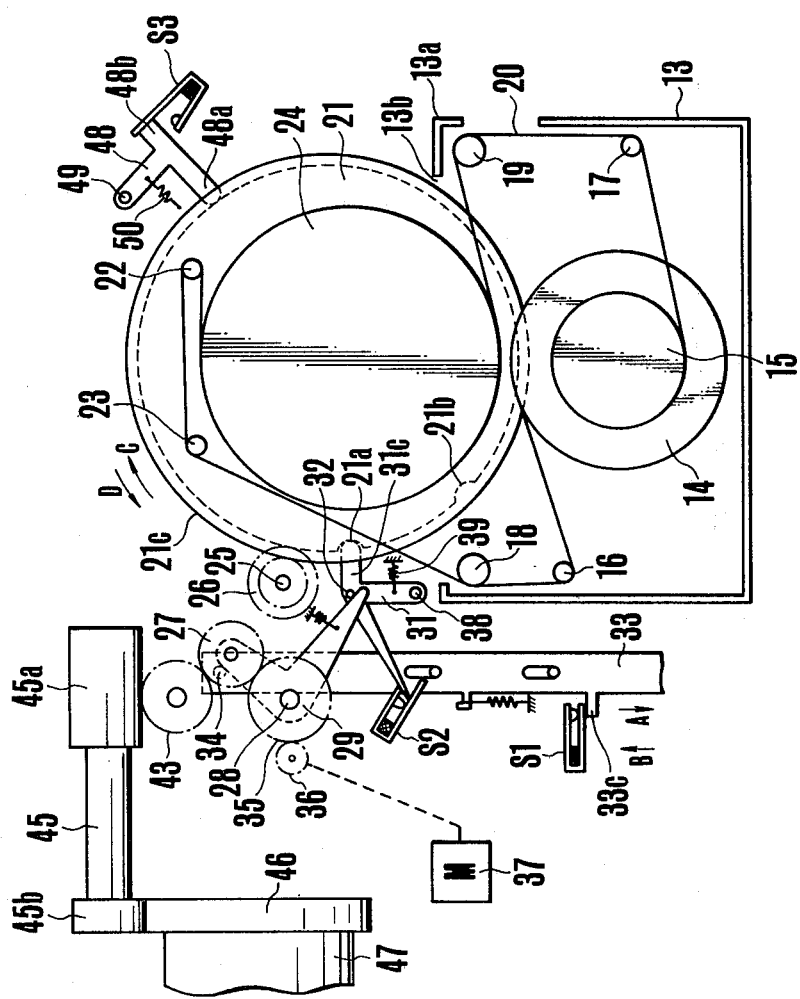
FIG. 5 is an illustration showing the structural arrangement as in a condition after completion of loading.

The embodiment which is arranged as described above operates in the following manner:

When the recording button (not shown) which is included in the group of operation buttons 10 is depressed, under the inoperative condition as shown in FIG. 3, this causes the slide plate 33 which is interlocked therewith to slide in the direction of arrow B. The sliding movement of the slide plate 33 turns on the switch S1 for detecting the recording mode. The level of the output P1 of the switch S1 changes from a low level to a high level. At that time, the loading completion detecting switch S2 is off and has its output P2 at a low level. Therefore, the level of the output of the AND circuit 51 becomes high. As a result of this, the level of the output of the OR circuit 58 changes from a low level to a high level. The transistor T1 is caused to turn on to cause an exciting current to flow to the exciting coil 60d of the relay 60. Accordingly, the fixed terminal 60a of the relay 60 comes to be connected to the change-over terminal 60c to cause a d.c. current of the power source Vcc to be supplied to the d.c. motor 37. The motor 37 begins to rotate. The rotation of the motor 37 is transmitted to the loading ring 21 through the gears 36, 27 and 26. The loading ring 21 begins to rotate in the direction of arrow C. The rotation of the loading ring 21 causes the tape 20 to be pulled out from the cassette 13 by the tape pull-out pins 22 and 23. The tape 20 thus comes to be wound round the guide drum 24. Concurrently with this, the unloading detecting lever 48 is released from the state of having fallen in the recess 21b. The switch S3 then turns off. Following this, as shown in FIG. 5, the loading ring 21 turns within a predetermined range of angle to have the tape 20 wound round the guide drum 24 at a predetermined angle of about 180 degrees. A tape loading operation is completed in this manner with the tape brought to the second position thereof. Then, as shown in FIG. 5, the arm 31c of the loading end detecting lever 31 comes to fall in a recess 21a formed in the circumference of the loading ring 21. The urging force of the spring 39 then causes the detecting lever 31 to rotate clockwise on the pin 38. The rotation of the detecting lever 31 causes the force transmission change-over lever 29 which serves as transmission means to rotate counterclockwise. This causes the change-over gear 27 to move away from the gear 26 and to come to engage the worm wheel 43. In other words, the rotating force of the motor 37 is shifted from the loading ring 21 to a state of being transmitted to the zoom gear 46 for driving the zoom mechanism. In this instance, the falling of the loading end detecting lever 31 into the recess 21a as mentioned above causes the loading completion detecting switch S2 to turn on. The level of the output P2 of the switch S2 becomes high. Accordingly, the level of the output of the AND circuit 51 changes to a low level. Then, the output of the OR circuit 58 changes from a high level to a low level to cause the transistor T1 to turn off. As a result of this, the fixed terminal 60a is connected to the change-over terminal 60b. The supply from the d.c. power source Vcc to the motor 37 is then cut off unless the zoom button 7 or 8 is depressed. Accordingly, the motor 37 come to a stop.

When the arm 31c of the loading end detecting lever 31 falls in the recess 21a formed in the circumference of the loading ring 21 to come into a locked state, the loading ring 21 is locked by a weak force in a loading completed position. Further, in this instance, if the locked state obtained by the engagement of the arm 31c with the recess 21a is not sufficient, a suitable locking means (not shown) may be separately arranged to ensure that the loading ring 21 is locked in the loading completed position upon completion of loading.

Referring to FIG. 5, upon completion of loading of the tape 20, a control means which is not shown causes the tape 20 to be pinched by pinch rollers which are not shown, and to be pressed to a capstan (also not shown) to bring the VTR into a recording condition. Under this recording condition, a depressing operation on the release switch 12 causes the tape 20 to begin to travel. Recording is carried out by a recording circuit and a recording mechanism which are not shown. Further, under this condition, the loading completion detecting switch S2 is in an on state and the output P2 thereof is at a high level. Therefore, a prescribed zooming operation can be carried out by depressing the zoom button 7 or 8. More specifically, a depressing operation on the zoom button 8 for wide-angle imaging causes the switch S4 to turn on. The OR circuit 58 comes to be at a high level to turn on the transistor T1. The relay 60 is driven by this. With the relay thus operated, the power source Vcc causes a current to flow to the motor 37 in a direction from the lead terminal 37a to the lead terminal 37b and the motor begins to rotate. The rotation of the motor 37 is transmitted to the gears 36, 35 and 27 and the worm wheel 43 and, through the force transmission shaft 45, to the zoom gear 46 to actuate the zoom mechanism in the direction of wide-angle imaging. A depressing operation on the zoom button 7 for telephoto causes the switch S5 to turn on. The level of the OR circuit 61 becomes high to turn on the transistor T2. The relay 63 is then driven. The power source Vcc this time causes a current to flow to the motor 37 in a direction from the lead terminal 37b to the other terminal 37a. The motor then begins to rotate in the direction which is opposite to the direction in which the motor rotates when the zoom button 8 for wide-angle imaging is depressed. Therefore, the rotation of the motor 37 is transmitted to the zoom gear 46 through the gears 36, 35 and 27 and the force transmission shaft 45 by the worm wheel 43. The zoom mechanism is then actuated in the telephoto direction.

The unloading operation of the embodiment is as follows. For unloading after completion of recording on the tape, the recording button is released from the state of being depressed. In response to the releasing operation on the recording button, the slide plate 33 is pulled back in the direction of arrow A by the urging force of the spring 42. This causes the force transmission change-over lever 29 to engage the lock pin provided on the slide plate 33 and to turn clockwise against the urging force of the spring 30. The gear 27 moves away from the worm wheel 43 and thus changes to a state of engaging the large diameter part 26b of the gear 26. Meanwhile, the sliding movement of the slide plate 33 in the direction of arrow A causes the switch S1 to change from an on state to an off state. The level of the output of the switch S1 becomes low. Since the unloading detecting switch S3 is in an off state at that time and its output is at a low level, the level of the output of the AND circuit 53 becomes high. As a result of this, the level of the output of the OR circuit 61 becomes high to cause the transistor T2 to turn on. Accordingly, the relay 63 is driven and the motor 37 begins to rotate. Since a current is flowing at the motor 37 from the lead terminal 37b to the lead terminal 37a in this instance as mentioned in the foregoing, the motor rotates in the direction opposite to the direction in which the motor rotates at the time of loading. The rotation of the motor 37, therefore, is transmitted to the loading ring 21 through the gears 36, 35, 27 and 26 to cause the loading ring 21 to rotate in the direction of arrow D. When the loading ring 21 begins to rotate, the loading end detecting lever 31 is released from the state of having fallen in the recess 21a and the switch S2 turns off. Then, when the loading ring 21 comes back to its state prior to loading as shown in FIG. 3, the unloading completion detecting lever 48 comes into the state having fallen in the recess 21b of the loading ring 21. This causes the switch S3 to turn on. As a result of that, the level of the output P3 of the switch S3 becomes high and that of the output of the AND circuit 53 low. Accordingly, the level of the output of the OR circuit 61 becomes low. The transistor T2 turns off to cause the rotation of the motor 37 to come to a stop. The unloading operation is completed and the embodiment comes back to the inoperative condition as shown in FIG. 3.

As described in the foregoing, in the embodiment of the invention, a change-over arrangement of the force transmission mechanism serves to selectively carry out the driving operations on the loading mechanism and on the means for controlling the optical system of the video camera, by using a single drive source such as the motor 37. This arrangement dispenses with another motor.

Further, while the change-over operation of the force transmission mechanism is arranged to be effected by mechanical means in the above described embodiment, the invention is not limited to such arrangement. For example, the mechanical arrangement may be replaced with a suitable electrical circuit to have the force transmission change-over lever operated by means of a plunger type solenoid arrangement or the like.

As for the image pick-up means, the use of a solid state image pick-up element such as CCD has been described by way of example in the embodiment. However, the use of the solid state image pick-up element may be replaced with a small pick-up tube.

The optical system to be controlled by the control means is not limited to the zoom optical system and the focusing optical system, but the control means is applicable also to other optical systems.

Further, in accordance with the invention, the recording means is not limited to the magnetic head used in the embodiment. The use of the magnetic head may be replaced with some optical recording means. As for the recording medium to be used in combination with the recording means, the medium is not limited to a tape shaped recording medium but may be a disc shaped one or may be selected from media of other shapes. A recording medium of any shape is usable so long as it is arranged such that its position at the time of loading on the recorder automatically changes to another position at the time of recording.

The video recorder according to this invention includes, as described in the foregoing, the motor and the rotation force transmission means which is shiftable to selectively transmit the rotation of the motor to the tape loading mechanism or to the zoom mechanism. This arrangement obviates the necessity for another unit of the motor which is particularly heavy among other components, and occupies a large space. This permits reduction in cost. In accordance with the invention, therefore, a video recorder which is small in size and light in weight can be obtained at a low cost.

What is claimed is:

1. A video recorder comprising:
    (a) image pick-up means for converting an optical image into an electrical signal;
    (b) an optical system which forms the optical image by guiding light flux from an object to be recorded to said image pick-up means;
    (c) control means responsive to a driving force for controlling the condition of the light flux to be guided to the image pick-up means, said control means driving at least a part of the optical system;
    (d) recording means for recording the electrical signal from the image pick-up means on a recording medium;
    (e) displacement means responsive to a driving force for displacing the recording medium between a first position at which a case for housing the recording medium is loaded from the outside of the video recorder, and a second position at which a recording operation by the recording means can be performed;
    (f) a drive source for providing a driving force; and
    (g) transmission means arranged to be shiftable to selectively transmit the driving force of the drive source to one of said displacement means and said control means.

2. A video recorder according to claim 1, wherein said transmission means is arranged to perform a change-over operation wherein the driving force of said drive source is transmitted to said control means when the recording medium is in the second position.

3. A video recorder according to claim 1, wherein said displacement means operates to displace the recording medium from the first position to the second position before a recording operation by said recording means.

4. A video recorder according to claim 1, wherein said displacement means operates to displace the recording medium from the second position to the first upon completion of a recording operation by said recording means.

5. A video recorder according to claim 1, wherein said optical system includes a zoom optical system having an adjustable zooming ratio.

6. A video recorder according to claim 5, wherein said control means is arranged to control the zooming ratio of the zoom optical system.

7. A video recorder according to claim 1, wherein said recording means is arranged to perform a recording operation on a magnetic recording tape.

* * * * *